United States Patent Office 3,595,866
Patented July 27, 1971

---

3,595,866
1-AMINO-3-AMINOALKYL-3-PHENYLOXINDOLE-COMPOUNDS
Donald E. Butler, Ann Arbor, Mich., assignor to Parke, Davis & Company, Detroit, Mich.
No Drawing. Filed Jan. 19, 1970, Ser. No. 4,043
Int. Cl. C07d 27/40
U.S. Cl. 260—293.4
6 Claims

ABSTRACT OF THE DISCLOSURE 1-amino-3-aminoalkyl-3-phenyloxindoles, in which the 1-amino group is substituted by an aralkyl group and by methyl, ethyl, or allyl and the 3-aminoalkyl group is a dialkylaminoalkyl group or a heterocyclic aminoalkyl group; acid-addition salts thereof; and their production by (1) reacting an alkali metal salt of a 1-amino-3-phenyloxindole with a haloalkylamine, (2) reacting a 1-amino-3-haloalkyl-3-phenyloxindole with an amine in the presence of a base, (3) reacting a 1-amino-3-(primary amino)alkyl-3-phenyloxindole with an aldehyde and gaseous hydrogen in the presence of a hydrogenation catalyst, and (4) reacting a 1-amino-3-(acylamino)alkyl-3-phenyloxindole with a reducing agent. The compounds of the invention are useful as chemical intermediates and as pharmacological agents that are active primarily as antidiarrheal agents.

SUMMARY AND DETAILED DESCRIPTION

The present invention relates to new oxindole compounds that are useful as pharmacological agents and to methods for their production. More particularly, the invention relates to new 1-amino-3-aminoalkyl-3-phenyloxindole compounds, which in free base form have the formula

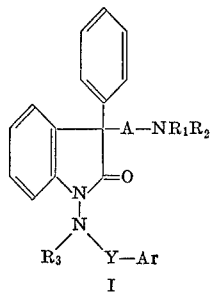

I and to pharmaceutically-acceptable acid-addition salts thereof; where each of $R_1$ and $R_2$ is an alkyl radical having not more than 3 carbon atoms or $R_1$ and $R_2$ are combined and together with the nitrogen atom to which they are attached represent 1-pyrrolidinyl, piperidino, hexahydro-1H-azepin-1-yl, 3-methylpiperidino, or 2,6-dimethylpiperidino; $R_3$ is methyl, ethyl, or allyl; A represents ethylene, propylene, or trimethylene; Y represents methylene, ethylene, or ethylidene; and Ar represents phenyl, monosubstituted phenyl, in which the substituent is fluorine, chlorine, bromine, trifluoromethyl, methyl, methoxy, ethoxy, methylthio, ethylthio, or n-propylthio, dichlorophenyl, 2-chloro-3-methoxyphenyl, 2-furyl, or 2-thienyl.

In accordance with the invention, 1-amino-3-amino- alkyl-3-phenyloxindole compounds having Formula I above and acid-addition salts thereof are produced by reacting an alkali metal salt, preferably the sodium salt, of a 1-amino-3-phenyloxindole compound having the formula

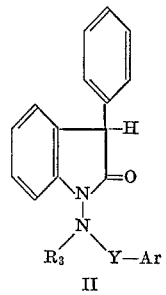

II with a haloalkylamine compound having the formula

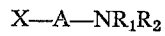

III where $R_1$, $R_2$, $R_3$, A, Y, and Ar have the aforementioned significance, and X is halogen, preferably chlorine or bromine. The reaction is preferably carried out in an unreactive solvent medium. Suitable solvents include aromatic hydrocarbons, such as benzene, toluene, and xylene; ethers, such as dioxane, tetrahydrofuran, dibutyl ether, and 1,2-dimethoxyethane; tertiary amides, such as N, N-dimethylformamide and N-methyl-2-pyrrolidinone; dimethyl sulfoxide; and mixtures of the foregoing. A preferred solvent medium is a mixture of tetrahydrofuran and toluene. The temperature and duration of the reaction are not critical and may be varied over a wide range, from room temperature for 24–30 hours to 150° C. for 1–3 hours. Preferred conditions are a temperature in the range of 50–80° C. and a duration of about 12–20 hours. Equivalent amounts of reactants may be used, but it is preferable to employ the haloalkylamine compound in slight to moderate excess. The alkali metal salt of the 1-amino-3-phenyloxindole compound is most conveniently prepared in situ by reacting the selected oxindole compound with a strong base, such as an alkali metal hydride, preferably sodium hydride, an alkali metal amide, or an alkali metal alkoxide, preferably in a nitrogen atmosphere, at room temperature or slightly higher for several hours or until salt formation is complete. The reaction is also conveniently carried out in a single step by heating a mixture of the oxindole compound, the haloalkylamine, and the strong base, preferably in a nitrogen atmosphere, in the chosen solvent medium until reaction is complete. The product of the reaction can be isolated in free base or acid-addition salt form by suitable adjustment of the pH of the reaction mixture.

The 1-amino-3-phenyloxindole compounds having Formula II that are required as starting materials in the foregoing process are prepared by reacting α-chlorodiphenylacetyl chloride with a substituted hydrazine compound having the formula

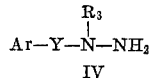

IV where Ar, Y, and $R_3$ are as defined previously. The substituted hydrazines in turn are prepared by a variety of methods. In one method, an arylcarboxylic acid having the formula

Ar—COOH

V is reacted with thionyl chloride to give the corresponding arylcarboxylic acid chloride, which is esterified by reaction with methanol, and the methyl ester obtained is reduced by reaction with lithium aluminum hydride to given an arylmethanol compound having the formula Ar—CH$_2$—OH

VI

This intermediate is then reacted with thionyl chloride, and the arylmethyl chloride compound that is obtained is reacted with methyl-, ethyl-, or allylhydrazine to give one of the desired substituted hydrazine starting materials that can be represented by the formula

$$\text{Ar—CH}_2\text{—}\underset{\underset{\text{R}_3}{|}}{\text{N}}\text{—NH}_2$$

VII

In a second method, the arylcarboxylic acid chloride obtained from reaction of the arylcarboxylic acid of Formula V with thionyl chloride is reacted with methyl-, ethyl-, or allylhydrazine, and the arylcarboxylic acid hydrazide obtained, having the formula

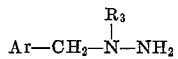

$$\text{Ar}\overset{\text{O}}{\overset{\|}{-}}\text{C}\text{—}\underset{\underset{\text{R}_3}{|}}{\text{N}}\text{—NH}_2$$

VIII is reduced by reaction with lithium aluminum hydride also to give one of the desired starting materials represented by Formula VII. In a third method, an amine compound having the formula

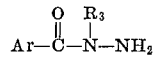

$$\text{Ar—Y—}\underset{\underset{\text{R}_3}{|}}{\text{N}}\text{H}$$

IX is reacted with sodium nitrite and hydrochloric acid to give an N-nitrosoamine compound having the formula

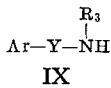

$$\text{Ar—Y—}\underset{\underset{\text{R}_3}{|}}{\text{N}}\text{—NO}$$

X which is reduced by reaction with lithium aluminum hydride to give one of the desired substituted hydrazine starting materials having Formula IV. In the foregoing formulas, each of Ar and R$_3$ has the same meaning as previously given. Each of the above methods is illustrated in detail hereinafter for the preparation of individual compounds.

Also in accordance with the invention, 1-amino-3-aminoalkyl-3-phenyloxindole compounds having Formula I above and acid-addition salts thereof are produced by reacting a 1-amino-3-haloalkyl - 3 - phenyloxindole compound having the formula

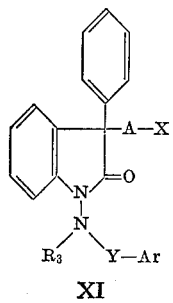

XI with an amine compound having the formula

R$_1$R$_2$NH

IIX in the presence of a base; where each of R$_1$, R$_2$, R$_3$, A, Y, Ar, and X has the same meaning as previously given. Suitable bases that may be used in the reaction include alkali metal carbonates, alkali metal bicarbonates, alkaline earth metal oxides, alkaline earth metal hydroxides, alkaline earth metal carbonates, and organic tertiary amines of stronger base strength than the amine reactant of Formula VI. In actual practice, it is most convenient and preferable to employ a large excess of the amine reactant, in which case additional base is not required. In such a case, added solvent is not required, although a wide variety of non-reactive solvents can be used, if desired. These include aliphatic and aromatic hydrocarbons, such as n-heptane, isooctane, benzene, and toluene; chlorinated hydrocarbons, such as chloroform, carbon tetrachloride, ethylene chloride, tetrachloroethylene, and chlorobenzene; lower alkanols, such as ethanol and 2-propanol; ethers, such as diisopropyl ether, dioxane, and tetrahydrofuran; tertiary amides, such as N,N-dimethylformamide and N-methyl-2-pyrrolidinone; dimethyl sulfoxide; and mixtures of these. The temperature and duration of the reaction are not critical and may be varied over a wide range, from room temperature for 8–12 hours to 200° C. for 10–30 minutes. In most cases, the reaction is most conveniently carried out at the reflux temperature of the reaction mixture. Where a low-boiling amine reactant is employed, the reaction is best carried out in a sealed pressure vessel at a temperature of about 90–100° C. Equivalent amounts of reactants may be used; for best results, however, at least a two-fold molar excess of the amine reactant is employed. The product of the reaction can be isolated in free base or acid-addition salt form by suitable adjustment of the pH of the reaction mixture.

The 1-amino-3-haloalkyl-3-phenyloxindole starting materials are prepared by reacting an alkali metal salt of a 1-amino-3-phenyloxindole compound having Formula II above with an alkylene halide having the formula

X—A—X

XIII where A and X are as defined previously.

Further in accordance with the invention, 1-amino-3-aminoalkyl-3-phenyloxindole compounds having the formula

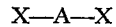

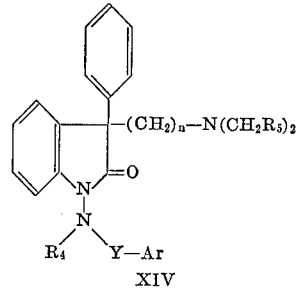

XIV and acid-addition salts thereof are produced by reacting a 1-amino-3-(primary amino)alkyl - 3 - phenyloxindole compound having the formula

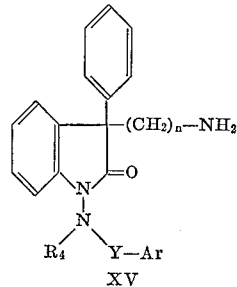

XV with an aldehyde compound having the formula

R$_5$CHO

XVI and gaseous hydrogen in the presence of a hydrogenation catalyst; where Ar and Y have the aforementioned significance, $R_4$ is methyl or ethyl, $R_5$ is hydrogen, methyl, or ethyl, and $n$ is 2 or 3. Preferred catalysts for use in the reaction are the noble metal catalysts, platinum, platinum oxide, palladium, and palladium oxide, which may optionally be supported on an inert carrier, such as charcoal. An individual preferred catalyst is platinum-on-charcoal. Hydrogen is supplied to the reaction under a pressure of about 2 to 4 atmospheres. The reaction is best carried out in an unreactive solvent medium. Suitable solvents include lower alkanols, such as methanol and ethanol; ethers, such as dioxane, tetrahydrofuran, and 1,2-dimethoxyethane; tertiary amides, such as N,N-dimethylformamide and N-methyl-2-pyrrolidinone; and mixtures of these. A preferred solvent is absolute ethanol. The temperature and duration of the reaction are not critical and may be varied over a wide range. The reaction is conveniently carried out at room temperature and is allowed to proceed until the required amount of hydrogen (4 molecular equivalents) is taken up. At least two moles of aldehyde compound are used for each mole of the oxindole primary amine of Formula XV. The product of the reaction can be isolated in free base or acid-addition salt form by suitable adjustment of the pH of the reaction mixture.

The 1-amino-3-(primary amino)alkyl-3-phenyloxindole starting materials are prepared by hydrogenating a 1-amino-3-cyanoalkyl-3-phenyloxindole compound having the formula

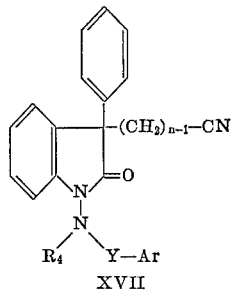

XVII in the presence of Raney cobalt; where $R_4$, Y, Ar, and $n$ are as earlier defined. The cyanoalkyl-oxindoles, in turn, are prepared in a number of ways. For example, 1-(benzylmethylamino)-3-cyanomethyl-3-phenyloxindole is prepared by reacting the sodium salt of 1-(benzylmethylamino)-3-phenyloxindole (prepared by reacting the parent oxindole with sodium hydride) with chloroacetonitrile. 1 - (benzylmethylamino)-3-(2-cyanoethyl)-3-phenyloxindole, on the other hand, is prepared by reacting 1-(benzylmethylamino)-3-phenyloxindole with acrylonitrile in the presence of benzyltrimethylammonium methoxide.

Still further in accordance with the invention, 1-amino-3-aminoalkyl-3-phenyloxindole compounds having the formula

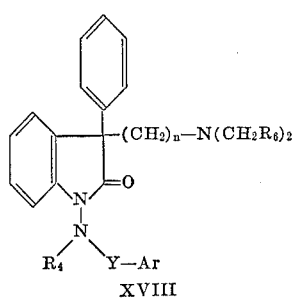

XVIII or the formula

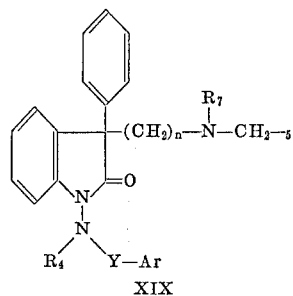

XIX and acid-addition salts thereof are produced by reacting a 1 - amino - 3-(acylamino)alkyl-3-phenyloxindole compound having the formula

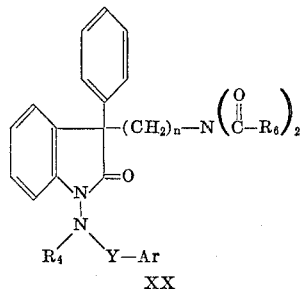

XX or the formula

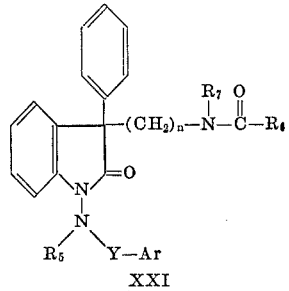

XXI with a reducing agent; where each of $R_4$, $R_5$, Y, Ar, and $n$ is as previously defined; $R_6$ is methyl or ethyl; and $R_7$ is methyl, ethyl, or propyl. When the starting material is the compound of Formula XX, the product is the compound represented by Formula XVIII; the compound of Formula XIX is the product obtained when the starting material is the compound of Formula XXI. Either borane ($BH_3$) or lithium aluminum hydride may be used as reducing agent; borane is preferred. The reaction is best carried out in an unreactive solvent medium, which is preferably an ether, such as diethyl ether, dioxane, tetrahydrofuran, and diethylene glycol dimethyl ether. The temperature and duration of the reaction are not critical and may be varied widely, the temperature from room temperature to the boing point of the reaction mixture and the duration from about one to about 24 hours. It is convenient to carry out initial phase of the reaction at room temperature for a period of 1–3 hours and then to heat the reaction mixture at 50–80° C. for a period of up to 24 hours to insure completeness of reaction. With borane as the reducing agent, it is best to use a slight excess over the amount required to reduce completely the acyl groups. An excess of lithium aluminum hydride, however, should be avoided so as not to reduce the carbonyl group of the oxindole ring. Following initial reaction with the reducing agent, the reaction mixture is hydrolyzed with an aqueous medium, such as water, dilute aqueous inorganic acids and bases, and other media containing water. The product of the reaction can then be isolated either in free base or acid-addition salt form by suitable adjustment of the pH of the hydrolyzed reaction mixture.

The 1-amino-3-(acylamino)alkyl-3-phenyloxindole starting materials having Formula XX are prepared by reacting a 1-amino-3-(primary amino)alkyl-3-phenyloxindole compound of Formula XV above with two molecular equivalents of an acid halide having the formula

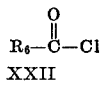

XXII in pyridine. The starting materials having Formula XXI are prepared by first reacting the oxindole primary amine of Formula XV with a methyl alkanoate having the formula

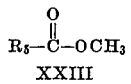

XXIII and then reacting the intermediate 1-amino-3-(acylamino)alkyl-3-phenyloxindole compound obtained, having the formula

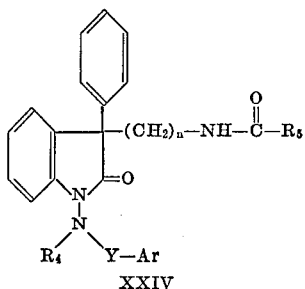

XXIV with an alkyl iodide having the formula

XXV in the presence of sodium hydride. In the foregoing formulas, $R_4$, $R_5$, $R_6$, $R_7$, Y, Ar, and $n$ are as previously given.

The compounds of the invention can exist in the free base form having Formula I or in the form of an acid-addition salt. Pharmaceutically-acceptable acid-addition salts are formed with a variety of inorganic and organic acids, such as hydrochloric, hydrobromic, hydroidic, sulfuric, nitric, phosphoric, acetic, benzoic, citric, maleic, malic, tartaric, succinic, gluconic, ascorbic, sulfamic, pamoic, and related acids. The free bases and salts are generally equivalent for purposes of the invention, except that one or the other may be preferred for particular solubility properties. The compounds of the invention are also capable of existing in optically active forms.

The compounds of the invention are new chemical compounds that are useful chemical intermediates and pharmacological agents. As pharmacological agents, they are active primarily as antidiarrheal agents. Their activity in this regard is demonstratble and quantitatively measurable in a test designed to measure the ability of a test compound to inhibit stomach emptying in rats of a test meal containing radioactive barium. The test is carried out as follows.

Male rats, weighing 135–150 grams each, are fasted overnight and assigned to test or carrier control groups by random block design, with 10–20 rats per group. The test compound or carrier is then administered orally. Thirty minutes following administration of the test compound, all the rats are given, by gavage, 2 ml. of a test meal consisting of a 20% $BaSO_4$—$Ba^{133}$ suspension in methocel-saline. After another thirty-minute period, the rats are sacrificed and their stomachs and small intestines are removed and divided into segments. The gamma emissions from the $Ba^{133}$ label are then measured to determined the amount of meal retained in each segment, and the percentage of the administered test meal emptied from each segment is computed. The effect of the test compounds in inhibiting stomach emptying is evaluated by comparing the computed mean percentages for the test groups with those of the control groups. Inhibition of stomach emptying is used as the test criterion because it has been found that compounds that inhibit stomach emptying also inhibit emptying from the various segments of the small intestine.

The results obtained in the test described above for some representative compounds of the present invention are given in the following table. In this table, the activity of each compound is expressed as the lowest dose that gave a significant difference ($p \leq 0.05$) in stomach emptying between the test group and the carrier control group. The table also shows the result obtained for morphine, which is known to be useful as an antidiarrheal agent. The demonstration of activity for morphine indicates the validity of the test procedure for determining antidiarrheal activity.

INHIBITION OF STOMACH EMPTYING

| Compound: | Minium effective dose, mg. base/kg. |
|---|---|
| 1 - (benzylmethylamino) - 3 - [3 - (dimethylamino)propyl]-3-phenyloxindole | [1] 25 |
| 1 - [(o - chlorobenzyl)methylamino]-3-[2-(diethylamino)ethyl]-3-phenyloxindole | 12.5 |
| 3-[2-(diethylamino)ethyl] - 1 - [(p - methoxybenzyl)methylamino] - 3 - phenyloxindole | 3.12 |
| 3 - [2 - (diethylamino)ethyl] - 1 - {methyl[o-3 - [2 - (diethylamino)ethyl] - 3 - phenylindole | 6.25 |
| 1-[(2 - chloro-3-methoxybenzyl)methylamino]-oxindole | 10.0 |
| Morphine | [2] 5.0 |

[1] Administered as the monohydrochloride salt.
[2] Administered as the sulfate salt.

The compounds of the invention are preferably administered orally, although parenteral administration can also be used. They can be combined with either a solid or liquid carrier or diluent and made available in varying amounts in such pharmaceutical forms as tablets, capsules, powders, and aqueous and non-aqueous suspensions and solutions.

As chemical intermediates, the compounds of the invention can be converted by reaction with a reducing agent to corresponding 1-amino-3-aminoalkyl-3-phenylindoline compounds, which are also active as antidiarrheal agents, as more fully disclosed in my application filed concurrently herewith, entitled "1-amino-3-aminoalkyl-3-phenylindoline Compounds and Methods for Their Production," Ser. No. 4,127 filed Jan. 19, 1970.

The invention is illustrated by the following examples.

Example 1

To a mixture of 7.5 g. of a 55% sodium hydride in mineral oil dispersion (0.17 mole of sodium hydride) and 800 ml. of tetrahydrofuran, stirred in a nitrogen atmosphere, is first added, in portions, 52 g. (0.14 mole) of 1-[(o-chlorobenzyl)methylamino] - 3 - phenyloxindole, then a solution of 28 g. (0.21 mole) of β-chlorotriethylamine in 150 ml. of toluene. The resulting reaction mixture is stirred and heated under reflux for 16 hours, cooled, and poured slowly into water. The organic phase is separated and extracted with dilute hydrochloric acid. The acidic extract is then made alkaline with 50% aqueous sodium hydroxide, and the alkaline mixture is extracted with ether. The ether extract is washed with water, dried, and evaporated to dryness to give a residue of 1-[(o-chlorobenzyl)methylamino] - 3 - [2-(diethylamino)ethyl]-3-phenyloxindole, which is purified by distillation under reduced pressure; B.P. 214–215° C./0.46 mm. Hg. This free base product is converted to a salt with succinic acid by reacting it with an equivalent quantity of succinic acid in 2-propanol. A salt with citric acid is obtained by mixing solutions of the free base and the citric acid in methanol and concentrating the mixture to a small volume.

In the foregoing procedure, the same free base product is obtained when 6.6 g. of sodamide is substituted for the sodium hydride dispersion and 37.8 g. of β-bromotriethylamine is substituted for the β-chlorotriethylamine.

Example 2

Utilizing the general procedure described in Example 1 above, the following 1-amino-3-aminoalkyl-3-phenyloxindoles are obtained from the reaction of the 3-phenyloxindole compound and haloalkylamine compound designated below in the presence of sodium hydride. In each case, the molar ratios of the three reactants are approximately those employed in Example 1 above.

(1) 1-(benzylmethylamino) - 3 - [2-(dimethylamino) ethyl]-3-phenyloxindole, M.P. 87–90° C.; from 1-(benzylmethylamino) - 3 - phenyloxindole and 2-chloro-N,N-dimethylethylamine.

(2) 1-(benzylmethylamino) - 3 - [2-(diethylamino) ethyl]-3-phenyloxindole, B.P. 296–208° C./0.46 mm. Hg; from 1-(benzylmethylamino) - 3 - phenyloxindole and β-chlorotriethylamine.

(3) 1-(benzylmethylamino) - 3 - [3-(dimethylamino) propyl]-3-phenyloxindole; from 1-(benzylmethylamino)-3-phenyloxindole and 3 - chloro - N,N - dimethylpropylamine. The monohydrochloride salt is preapared by dissolving the free base product in 2-propanol and treating the solution with an excess of 2-propanolic hydrogen chloride; M.P. 189–191° C., following crystallization from 2-propanol-ether.

(4) 1-(benzylmethylamino) - 3 - [3 - (diethylamino) propyl[-3-phenyloxindole, B.P. 192–196° C./0.15 mm. Hg; from 1-(benzylmethylamino)-3-phenyloxindole and 3-chloro-N,N-diethylpropylamine.

(5) 1-(benzylmethylamino) - 3 - phenyl-3-[2-(1-pyrrolidinyl)ethyl]oxindole, from 1-(benzylmethylamino)-3-phenyloxindole and N - (2-chloroethyl)pyrrolidine. The monohydrochloride salt, prepared as in (3) above, has M.P. 211.5–212.5° C., following crystallization from 2-propanol-ether.

(6) 1-(benzylmethylamino) - 3 - phenyl-3-(2-piperidinoethyl)oxindole, B.P. 215–225° C./0.25 mm. Hg; from 1-(benzylmethylamino)-3-phenyloxindole and N-(2-chloroethyl)piperidine.

(7) 1-(benzylmethylamino) - 3 - phenyl-3-[3-(1-pyrrolidinyl)propyl]oxindole, M.P. 89.5–91° C. (2-propanol-ether); from 1-(benzylmethylamino) - 3 - phenyloxindole and N-(3-chloropropyl)pyrrolidine.

(8) 1-(benzylmethylamino) - 3 - phenyl-3-(3-piperidinopropyl)oxindole (monohydrochloride, M.P. 207–209° C., crystallized from 2-propanol-ether); from 1-(benzylmethylamino)-3-phenyloxindole and N-(3-chloropropyl)piperidine.

(9) 1-(benzylmethylamino)-3-[2-(hexahydro-1H - azepin-1-yl)ethyl]-3-phenyloxindole, B.P. 216–217° C./0.21 mm. Hg; from 1-(benzylmethylamino)-3-phenyloxindole and N-(2-chloroethyl)hexamethyleneimine.

(10) 1-(benzylmethylamino)-3-[3 - (3 - methylpiperidino)propyl]-3-phenyloxindole, B.P. 204–207° C./0.21 mm. Hg; from 1-(benzylmethylamino)-3-phenyloxindole and N-(3-chloropropyl)-3-methylpiperidine.

(11) 1-(benzylmethylamino)-3-[3-(2,6-dimethylpiperidino)propyl]-3-phenyloxindole, B.P. 210–215° C./0.30 mm. Hg; from 1-(benzylmethylamino)-3-phenyloxindole and N-(3-chloropropyl)-2,6-dimethylpiperidine.

(12) 3-[2-(dimethylamino)ethyl]-1-(methylphenethylamino)-3-phenyloxindole (monohydrochloride, M.P. 183–184.5° C.); from 1-(methylphenethylamino)-3 - phenyloxindole and 2-chloro-N,N-dimethylethylamine.

(13) 3-[2-(diethylamino)ethyl]-1 - (methylphenethylamino)-3-phenyloxindole, B.P. 180–183° C./0.31 mm. Hg; from 1-(methylphenethylamino)-3-phenyloxindole and β-chlorotriethylamine.

(14) 3-[3-(dimethylamino)propyl]-1 - (methylphenethyl)amino]-3-phenyloxindole( monohydrochloride, M.P. 180.5–182.5° C.); from 1-(methylphenethylamino)-3-phenyloxindole and 3-chloro-N,N-dimethylpropylamine.

(15) 1-(benzylethylamino)-3 - [2 - (dimethylamino) ethyl]-3-phenyloxindole, M.P. 92.5–95° C.; from 1-(benzylethylamino)-3-phenyloxindole and 2-chloro-N,N-dimethylethylamine.

(16) 1-(benzylethylamino)-3-[2-diethylamino) ethyl]-3-phenyloxindole (dihydrochloride, M.P. 176–178.5° C.); from 1-(benzylethylamino)-3-phenyloxindole and β-chlorotriethylamine.

(17) 1-(benzylethylamino)-3 - [3 - (dimethylamino) propyl] - 3 - phenyloxindole (monohydrochloride, M.P. 181–184° C.); from 1-benzylethylamino)-3-phenyloxindole and 3-chloro-N,N-dimethylpropylamine.

(18) 3-[2-(dimethylamino)ethyl]-1-[methyl(α-methylbenzyl)amino]-3 - phenyloxindole (monohydrobromide, M.P. 223–226° C.); from 1 - [methyl(α - methylbenzyl) amino]-3-phenyloxindole and 2-chloro-N,N - dimethylethylamine.

(19) 3-[2-(dimethylamino)ethyl]-1-[methyl(α-methylbenzyl)amino]-3-phenyloxindole, M.P. 116.5–118.5° C.; from 1-[methyl(αmethylbenzyl)amino] - 3 - phenyloxindole and β-chlorotriethylamine.

(20) 3-[3 - (dimethylamino)propyl] - 1 - [methyl(α-methylbenzyl)amino]-3-phenyloxinodel (monohydrochloride, M.P. 196–197° C.); from 1-[methyl(α-methylbenzyl)amino]-3-phenyloxindole and 3-chloro-N,N - dimethylpropylamine.

(21) 1-(allylbenzylamino)-3 - [3 - (dimethylamino)-propyl]-3-phenyloxindole, B.P. 188–190° C./0.15 mm. Hg; from 1-(allyl-benzylamino)-3-phenyloxindole and 3-chloro-N,N-dimethylpropylamine.

(22) 1-(allylbenzylamino)-3-(2-(diethylamino)ethyl]-3-phenyloxindole, B.P. 184–190° C./0.125 mm. Hg; from 1-(allylbenzylamino)-3-phenyloxindole and β-chlorotriethylamine.

(23) 1-[(o-chlorobenzyl)methylamino]-3-[2-dimethylamino)ethyl]-3 - phenyloxindole, M.P. 98.5–101.5° C.; from 1-(o-chlorobenzyl)methylamino]-3-phenylidole and 2-chloro-N,N-dimethylethylamine.

(24) 1-[o-chlorobenzyl)methylamino]-3-[2-(dipropylamino)ethyl] - 3 - phenyloxindole (monohydrochloride, M.P. 202.5–204° C., crystallized from 2-propanol-ether); from 1-[(o-chlorobenzyl)methylamino]-3-phenyloxindole and 2-chloro-N,N-dipropylethylamine.

(25) 1-[(o-chlorobenzyl)methylamino]-3 - [3 - (dimethylamino)propyl] - 3 - phenyloxindole (monohydrochloride, M.P. 209–211.5° C., crystllized from 2-propanol-ether); from 1-[(o-chlorobenzyl)methylamino]-3-phenyloxindole and 3-chloro-N,N-dimethylpropylamine.

(26) 1-[o-chlorobenzyl)methylamino]-3-[3 - (diethylamino)propyl]-3-phenyloxindole, B.P. 199–210° C./0.15 mm. Hg; from 1-[(o-chlorobenzy)methylamino]-3-phenyloxindole and 3-chloro-N,N-diethylpropylamine.

(27) 1-[o-chlorobenzyl)methylamino]-3-phenyl-3 - (2-piperidinoethyl)oxindole, M.P. 118–120° C.; from 1-[(o-chlorobenzyl)methylamino]-3-phenyloxindole and N-(2-chloroethyl)piperidine.

(28) 1-[o-chlorobenzyl)methylamino]-3-(2 - hexahyro-1H-azepin-1-yl)ethyl] - 3 - phenyloxindole, M.P. 109.5–111.5° C.; from 1[(o-chlorobenzyl)methylamino-3-phenyloxindole and N-(2-chloroethyl hexamethyleneime.

(29) 1-[(o-chlorobenzyl)methylamino]-3-[3-(2,6 - dimethylpiperidino)propyl]-3 - phenyloxindole, B.P. 215–235° C./0.30 mm. Hg; from 1-[(o-chlorobennzyl)methylamino]-3-phenyloxindole and N-(3-chloropropyl) - 2,6-dimethylpiperidine.

(30) 1-[(m-chlorobenzyl)methylamino]-3-[2-(diethylamino)ethyl]-3-phenyloxindole, B.P. 195–205° C./0.16 mm. Hg; from 1-[(m-chlorobenzyl)methylamino] - 3-phenyloxindole and β-chlorotriethylamine.

(31) 1-[(m-chlorobenzyl)methylamino]-3 - [3 - (dimethylamino)propyl]-3 - phenyloxindole, B.P. 196–203° C./0.15 mm. Hg; from 1 - [(m - chlorobenzyl)methylamino]-3-phenyloxindole and 3-chloro-N,N-dimethylpropylamine.

(32) 1-[(p-chlorobenzyl)methylamino]-3-[2-(dimethylamino)ethyl]-3-phenyloxindole, M.P. 92–95° C.; from 1-[(p-chlorobenzyl)methylamino]-3-phenyloxindole and 2-chloro-N,N-dimethylethylamine.

(33) 1-[(p-chlorobenzyl)methylamino]-3-[2-(diethylamino)ethyl]-3-phenyloxindole, B.P. 215–216° C./0.475 mm. Hg; from 1-[(p-cholrobenzyl)methylamino]-3-phenyloxindole and β-chlorotriethylamine.

(34) 1-[(p-chlorobenzyl)methylamino]-3-[3-(dimethylamino)propyl]-3-phenyloxindole (monohydrochloride, M.P. 221.5–224.5° C., crystallized from 2-propanol-ether; from 1-[(p-chlorobenzyl)methylamino]-3-phenyloxindole and 3-chloro-N,N-dimethylpropylamine.

(35) 1-[(2,4-dichlorobenzyl)methylamino]-3-[2-(dimethylamino)ethyl]-3-phenoxindole, B.P. 205–214° C./0.15 mm. Hg; from 1-[(2,4-dichlorobenzyl)methylamino]-3-phenyloxindole and 2-chloro-N,N-dimethylethylamine.

(36) 1-[(2,4-dichlorobenzyl)methylamino]-3-[3-dimethylamino)propyl]-3-phenyloxindole, B.P. 204–206° C./0.20 mm. Hg; from 1-[(2,4-dichlorobenzyl)methylamino]-3-phenyloxindole and 3-chloro-N,N-dimethylpropylamine.

(37) 1-[(o-bromobenzyl)methylamino]-3-[3-(dimethylamino)propyl]-3-phenyloxindole; from 1-[(o-bromobenzyl)methylamino]-3-phenyloxindole and 3-chloro-N,N-dimethylpropylamine.

(38) 1-[(o-bromobenzyl)methylamino]-3-[2-(diethylamino)ethyl]-3-phenyloxindole; from 1-[(o-bromobenzyl)methylamino]-3-phenyloxindole and β-chlorotriethylamine.

(39) 3-[2-(dimethylamino)ethyl]-1-[(o-fluorobenzyl)methylamino]-3-phenyloxindole, B.P. 202–203° C./0.675 mm. Hg; from 1-[(o-fluorobenzyl)methylamino]-3-phenyloxindole and 2-chloro-N,N-dimethylethylamine.

(40) 3-[2-(diethylamino)ethyl]-1-[(o-fluorobenzyl)methylamino]-3-phenyloxindole, B.P. 180–190° C./0.20 mm. Hg; from 1-[(o-fluorobenzyl)methylamino]-3-phenyloxindole and β-chlorotriethylamine.

(41) 3-[3-(dimethylamino)propyl]-1-[o-fluorobenzyl)methylamino]-3-phenyloxindole, B.P. 204.5–207° C./0.70 mm. Hg; from 1-[o-fluorobenzyl)methylamino]-3-phenyloxindole and 3-chloro-N,N-dimethylpropylamine.

(42) 3-[2-diethylamino)ethyl]-1-[(p-fluorobenzyl)methylamino]-3-phenyloxindole, B.P. 202–204° C./0.40 mm. Hg; from 1-[(p-fluorobenzyl)methylamino]-3-phenyloxindole and β-chlorotriethylamine.

(43) 3-[2-(diethylamino)ethyl]-1-[methyl(o-methylbenzyl)amino]-3-phenyloxindole, B.P. 185–190° C./0.15 mm. Hg; from 1-[methyl(o-methylbenzyl)amino]-3-phenyloxindole and β-chlorotriethylamine.

(44) 3-[3-(dimethylamino)propyl]-1-[methyl(o-methylbenzyl)amino]-3-phenyloxindole, B.P. 195–197° C./0.15 mm. Hg; from 1-[methyl(o-methylbenzyl)amino]-3-phenyloxindole and 3-chloro-N,N-dimethylpropylamine.

(45) 3-[2-(dimethylamino)ethyl]-1-{methyl[o-(trifluoromethyl)benzyl]amino}-3-phenyloxindole, B.P. 185–187° C./0.12 mm. Hg; from 1-{methyl[o-(trifluoromethyl(benzyl]amino}-3-phenyloxindole and β-chlorotriethylamine.

(46) 3-[2-(dimethylamino)ethyl]-1-[(o-methoxybenzyl)methylamino]-3-phenyloxindole, B.P. 215–217° C./0.55 mm. Hg; from 1-[(o-methoxybenzyl)methylamino]-3-phenyloxindole and 2-chloro-N,N-dimethylethylamine.

(47) 3-[2-(diethylamino)ethyl]-1-[(o-methoxybenzyl)methylamino]-3-phenyloxindole (dihydrobromide, M.P. 149.5–153° C., crystallized from 2-propanol-ether); from 1-(o-methoxybenzyl)methylamino]-3-phenyloxindole and β-chlorotriethylamine.

(48) 3-[3-(dimethylamino)propyl]-1-[(o-methoxybenzyl)methylamino]-3-phenyloxindole, B.P. 192–194° C./0.25 mm. Hg; from 1-[(o-methoxybenzyl)methylamino]-3-phenyloxindole and 3-chloro-N,N-dimethylpropylamine.

(49) 3-[2-(dimethylamino)ethyl]-1-[(m-methoxybenzyl)methylamino]-3-phenyloxindole, B.P. 175–180° C./0.125 mm. Hg; from 1-[(m-methoxybenzyl)methylamino]-3-phenyloxindole and 2-chloro-N,N-dimethylethylamine.

(50) 3-[2-(diethylamino)ethyl]-1-[(m-methoxybenzyl)methylamino]-3-phenyloxindole, B.P. 208–215° C./0.20 mm. Hg; from 1-[(m-methoxybenzyl)methylamino]-3-phenyloxindole and β-chlorotriethylamine.

(51) 3-[3-(dimethylamino)propyl]-1-[(m-methoxybenzyl)methylamino]-3-phenyloxindole, B.P. 195–199° C./0.175 mm. Hg; from 1-[(m-methoxybenzyl)methylamino]-3-phenyloxindole and 3-chloro-N,N,-dimethylpropylamine.

(52) 3-[2-(dimethylamino)ethyl]-1-[(p-methoxybenzyl)methylamino]-3-phenyloxindole, B.P. 205–207° C./0.26 mm. Hg; from 1-[(p-methoxybenzyl)methylamino]-3-phenyloxindole and 2-chloro-N,N-dimethylethylamine.

(53) 3-[2-(diethylamino)ethyl]-1-[(p-methoxybenzyl)methylamino]-3-phenyloxindole, B.P. 205–215° C./0.30 mm. Hg; from 1-[(p-methoxybenzyl)methylamino]-3-phenyloxindole and β-chlorotriethylamine.

(54) 3-[3-(dimethylamino)propyl]-1-[(p-methoxybenzyl)methylamino]-3-phenyloxindole, B.P. 218–224° C./0.55 mm. Hg; from 1-[(p-methoxybenzyl)methylamino]-3-phenyloxindole and 3-chloro-N,N-dimethylpropylamine.

(55) 3-[3-(dimethylamino)propyl]-1-[(o-ethoxybenzyl)methylamino]-3-phenyloxindole, B.P. 205–210° C./0.30 mm. Hg; from 1-[(o-ethoxybenzyl)methylamino]-3-phenyloxindole and 3-chloro-N,N-dimethylpropylamine.

(56) 3-[2-(diethylamino)ethyl]-1-[(o-ethoxybenzyl)methylamino]-3-phenyloxindole, B.P. 185–205° C./0.15 mm. Hg; from 1-[(o-ethoxybenzyl)methylamino]-3-phenyloxindole and β-chlorotriethylamine.

(57) 3-[3-(dimethylamino)propyl]-1-{methyl[o-(methylthio)benzyl]amino}-3-phenyloxindole, M.P. 106.5–108.5° C.; from 1-{methyl[o-(methylthio)benzyl]amino}-3-phenyloxindole and 3-chloro-N,N-dimethylpropylamine.

(58) 3-[2-(dimethylamino)ethyl]-1-{methyl[o-(methylthio)benzyl]amino}-3-phenyloxindole, B.P. 217–225° C./0.175 mm. Hg; from 1-{methyl[o-(methylthio)benzyl]amino}-3-phenyloxindole and β-chlorotriethylamine.

(59) 3-[3-(diethylamino)propyl]-1-{methyl[o-(methylthio)benzyl]amino}-3-phenyloxindole, B.P. 218–222° C./0.20 mm. Hg; from 1-{methyl[o-(methylthio)benzyl]amino}-3-phenyloxindole and 3-chloro-N,N-diethylpropylamine.

(60) 1-{methyl[o-(methylthio)benzyl]amino}-3-phenyl-3-(2-piperidinoethyl)oxindole, M.P. 93.5–96° C.; from 1-{methyl[o-(methylthio)benzyl]amino}-3-phenyloxindole and N-(2-chloroethyl)piperidine.

(61) 3-[2-(hexahydro-1H-azepin-1-yl)ethyl]-1-{methyl[o-(methylthio)benzyl]amino}-3-phenyloxindole, B.P. 245–259° C./0.40 mm. Hg; from 1-{methyl[o-(methylthio)benzyl]amino}-3-phenyloxindole and N-(2-chloroethyl)hexamethyleneimine.

(62) 3-[3-(2,6-dimethylpiperidino)propyl]-1-{methyl[o-(methylthio)benzyl]amino}-3-phenyloxindole, B.P. 215–235° C./0.30 mm. Hg; from 1-{methyl[o-(methylthio)benzyl]amino}-3-phenyloxindole and N-(3-chloropropyl)-2,6-dimethylpiperidine.

(63) 3-[2-diethylamino)ethyl]-1-{methyl[p-(methylthio)benzyl]amino}-3-phenyloxindole, B.P. 214–221° C./0.225 mm. Hg; from 1-{methyl[p-(methylthio)benzyl]amino}-3-phenyloxindole and β-chlorotriethylamine.

(64) 3-[2-(diethylamino)ethyl]-1-{[o-(ethylthio)benzyl]-methylamino}-3-phenyloxindole, B.P. 227–229°

C./0.35 mm. Hg; from 1-{o-(ethylthio)benzyl]methylamino}-3-phenyloxindole and β-chlorotriethylamine.

(65) 3-[3 - (dimethylamino)propyl] - 1 - {methyl[o-propylthio)benzyl]amino}-3-phenyloxindole, B.P. 210–215° C./0.20 mm. Hg; from 1-{methyl[o-(propylthio)benzyl]amino} - 3 - phenyloxindole and 3-chloro-N,N-dimethylpropylamine.

(66) 3-[2-(diethylamino)ethyl] - 1 - {methyl[o-(propylthio)-benzyl]amino}-3-phenyloxindole, B.P. 221–226° C./0.25 mm. Hg; from 1-{methyl[o-(propylthio)benzyl] amino}-3-phenyloxindole and β-chlorotriethylamine.

(67) 1 - [(2-chloro-3-methoxybenzyl)methylamino]-3-[2-(diethylamino)ethyl]-3-phenyloxindole, B.P. 229–232° C./0.30 mm. Hg; from 1-[(2-chloro-3-methoxybenzyl)methylamino] - 3 - phenyloxindole and β-chlorotriethylamine.

(68) 3 - [2-(dimethylamino)ethyl]-1-(furfurylmethylamino)-3-phenyloxindole, B.P. 178–179° C./0.225 mm. Hg; from 1-(fufurylmethylamino)-3-phenyloxindole and 2-chloro-N,N-dimethylethylamine.

(69) 3-[2-(diethylamino)ethyl] - 1 - (furfurylmethylamino)-3-phenyloxindole, B.P. 185–186° C./0.30 mm. Hg; from 1-(furfurylmethylamino)-3-phenyloxindole and β-chlorotriethylamine.

(70) 3 - [3-dimethylamino)propyl]-1-(furfurylmethylamino)-3-phenyloxindole, B.P. 180.5–181° C./0.175 mm. Hg; from 1-(furfurylmethylamino)-3-phenyloxindole and 3-chloro-N,N-dimethylpropylamine.

(71) 3 - [3 - (dimethylamino)propyl] - 1 - (methyl-2-thenylamino)-3-phenyloxindole, M.P. 80–83.5° C.; from 1-(methyl-2-thenylamino)-3-phenyloxindole and 3-chloro-N,N-dimethylpropylamine.

(72) 3 - [2-(diethylamino)ethyl]-1-(methyl-2-thenylamino) - 3 - phenyloxindole, M.P. 96–99° C.; from 1-(methyl-2-thenylamino)-3-phenyloxindole and β-chlorotriethylamine.

Example 3

Utilizing the general procedure described in Example 1, the following mixtures of isomeric 1-amino-3-aminoalkyl-3-phenyloxindoles are obtained from the reaction of the 3-phenyloxindole compound and haloalkylamine compound designated below in the presence of sodium hydride. In each case, the molar ratios of the three reactants are approximately those employed in Example 1, and the boiling point given is that of the mixture; no attempt was made to separate the individual isomers.

(1) Mixture of 1 - (benzylmethylamino)-3-[2-(dimethyamino)-1-methylethyl] - 3 - phenyloxindole and 1-(benzylmethylamino)-3-[2 - (dimethylamino)propyl]-3-phenyloxindole, B.P. 180–183° C./0.35 mm. Hg; from 1-(benzylmehylamino)-3-phenyloxindole and 2 - chloro-N,N-dimethylpropylamine.

(2) Mixture of 1-[(o-chlorobenzyl)methylamino]-3-[2-(dimethylamino)-1-methylethyl]-3-phenyloxindole and 1-[(o-chlorobenzyl)methylamino]-3-[2 - dimethylamino) propyl]-3-phenyloxindole, B.P. 185–189° C./0.175 mm. Hg; from 1 - [(o-chlorobenzyl)methylamino]-3-phenyloxindole and 2-chloro-N,N-dimethylpropylamine.

(3) Mixture of 1 - [(o-chlorobenzyl)methylamino]-3-[2 - (diethylamino)-1-methylethyl]-3-phenyloxindole and 1-[(o-chlorobenzyl)methylamino]-3-[2 - (diethylamino) propyl]-3-phenyloxindole, B.P. 205–210° C./0.175 mm. Hg; from 1 - [(o-chlorobenzyl)methylamino]-3-phenyloxindole and 2-chloro-N,N-diethylpropylamine.

(4) Mixture of 3-[2-(dimethylamino) - 1 - methylethyl] - 1 - {methyl[o - (methylthio)benzyl]amino}-3-phenyloxindole and 3 - [2 - (dimethylamino)propyl]-1-{methyl[o-(methylthio)benzyl] - amino} - 3 - phenyloxindole, B.P. 205–210° C./0.20 mm. Hg; from 1-{methyl[o-(methylthio)benzyl]amino}-3-phenyloxindole and 2-chloro-N,N-dimethylpropylamine.

(5) Mixture of 3-[2-(diethylamino)-1-methylethyl]-1-{methyl[o - (methylthio)benzyl]amino}-3-phenyloxindole and 3-[2-(diethylamino)propyl] - 1 - {methyl[o-methylthio)benzyl]-amino}-3-phenyloxindole, B.P. 205–220° C./0.20 mm. Hg; from 1 - {methyl[o-(methylthio)benzyl] amino}-3-phenyloxnidole and 2-chloro-N,N-diethylpropylamine.

Example 4

A mixture of 47 g. of 1-[(o-chlorobenzyl)methylamino]-3-(2-bromoethyl)-3-phenyloxindole and 43 g. of piperidine is stirred and heated under reflux for 6 hours, cooled, diluted with ether, and filtered to remove the precipitated solid. The filtrate is extracted wiht dilute hydrochloric acid, and the acidic extract is made alkaline with 50% aqueous sodium hydroxide. The alkaline solution is extracted with ether, and the ether extract is dried and evaporated to dryness to give a solid residue of 1-[(o-chlorobenzyl)methylamino] - 3 - phenyl-3-(2-piperidinoethyl)oxindole; M.P. 118–120° C., following crystallization from 2-propanol.

Example 5

To a solution of 37.1 g. of 3-(2-aminoethyl)-1-(benzylmethylamino)-3-phenyloxindole and 9.0 g. of acetaldehyde in 200 ml. of absolute ethanol is added 1.0 g. of 5% platinum-on-charcoal, and the resulting mixture is shaken with hydrogen at an initial pressure of 50 lbs./in.$^2$ at room temperaturme until 2 molecular equivalents of hydrogen are taken up. The catalyst is then removed by filtration, and the filtrate is evaporated to dryness to give a residue of 1-(benzylmethylamino)-3-[2-(diethylamino)ethyl] - 3 - phenyloxindole; B.P. 192–194° C./0.20 mm. Hg.

Example 6

To a stirred solution of 37.1 g. of 3-(2-aminoethyl)-1-(benzylmethylamino) - 3 - phenyloxindole in 200 ml. of pyridine at 0° C. is slowly added 16 g. of acetyl chloride. The resulting mixture is then diluted with 500 ml. of ether and filtered to remove the precipitated pyridine hydrochloride, and the filtrate is evaporated under reduced pressure to give an oily residue of 1-(benzylmethylamino)-3 - [2-(N,N-diacetylamino)-ethyl]-3-phenyloxindole. This intermediate product is next dissolved in 200 ml. of tetrahydrofuran, 1.0 liter of a 1.0 molar borane in tetrahydrofuran solution is added, and the resulting mixture is stirred at 20–25° C. for 2 hours and then heated under reflux for 16 hours. Upon cooling, the solution is treated with 100 ml. of water and with 500 ml. of 3 N hydrochloric acid. The acidic aqueous mixture is evaporated under reduced pressure, and the residue obtained is made strongly alkaline with 50% aqueous sodium hydroxide. The alkaline mixture is extracted with ether, and the ether extract is dried and evaporated to dryness to give 1-(benzylmethylamino)-3-[2-(diethylamino)ethyl] - 3 - phenyloxindole; B.P. 192–194° C./0.20 mm. Hg.

Example 7

To a solution of 21 g. of 1-(benzylmethylamino)-3-(3-formamidopropyl)-3-phenyloxindole in 50 ml. of dimethyl sulfoxide at 20° C. is added first 8.5 g. of methyl iodide and then 2.18 g. of a 55% sodium hydride in mineral oil dispersion. The resulting mixture is stirred for one hour at room temperature and is then poured into a mixture consisting of 1.0 liter of ether and 200 ml. of water. The ethereal phase is isolated, dried, and evaporated under reduced pressure to give a residue of 1-(benzylmethylamino)-3-[3-(N - methylformamido)propyl]-3-phenyloxindole. This intermediate is dissolved in 200 ml. of tetrahydrofuran, 1.0 liter of a 1.0 molar borane in tetrahydrofuran solution is added, and the resulting mixture is stirred at 20–25° C. for 2 hours and is then heated under reflux for 16 hours. Upon cooling, the solution is treated with 100 ml. of water and with 500 ml. of 3 N hydrochloric acid. The acidic aqueous mixture is evaporated under reduced pressure, and the residue is made strongly alkaline with 50% aqueous sodium hydroxide.

The alkaline mixture is then extracted with ether, and the ether extract is dried and evaporated to dryness to give 1-(benzylmethylamino) - 3 - [3 - (dimethylamino) propyl]-3-phenyloxindole; B.P. 182–184° C./0.20 mm. Hg (monohydrochloride, M.P. 189–191° C., following crystallization from 2-propanol-ether).

Utilizing the foregoing procedure, with the substitution of 20 g. of 1-(benzylmethylamino)-3-(3-formamidoethyl)-3-phenyloxindole for the 1 - (benzylmethylamino)-3-(3-formamidopropyl) - 3 - phenyloxindole, there is first obtained the intermediate 1-(benzylmethylamino)-3-[2-(N-methylformamide)ethyl] - 3 - phenyloxindole, and then, upon reaction of this intermediate with boron, there is obtained 1 - (benzylmethylamino)-3-[2-(dimethylamino) ethyl]-3-phenyloxindole, M.P. 87–90° C.

Starting materials

The various starting materials employed in the foregoing examples and intermediates required for their preparation are obtained by the methods described in the following.

(I) 1-amino-3-phenyloxindoles (A) 1 - [(o - chlorobenzyl)methylamino] - 3 - phenyloxindole. To a stirred solution of 212 g. of α-chlorodiphenylacetyl chloride in 2.5 liters of ether at room temperature is added first a solution of 147 g. of 1-(o-chlorobenzyl)-1-methylhydrazine in 400 ml. of tetrahydrofuran and then 185 g. of N-ethylmorpholine. The resulting mixture is stirred and heated under reflux for 16 hours, cooled, and diluted with 1.0 liter of water. The organic phase is separated, washed well with water, dried, and evaporated to dryness under reduced pressure to give a solid residue of 1 - [(o-chlorobenzyl)methylamino]-3-phenyloxindole; M.P. 100–102° C., following crystalization from a mixture of ether, toluene, and methanol.

(B) Utilizing the procedure given in A above, the following 1-amino-3-phenyloxindoles are obtained from the reaction of α-chlorodiphenylacetyl chloride and the substituted hydrazine compound designated below. In each case, the molar ratios of the reactants are approximately equivalent to those employed in A above, and the solvent given in parentheses following the melting point is the solvent used for crystallization.

(a) 1-(benzylmethylamino) - 3 - phenyloxindole, M.P. 83–85° C. (2-propanol); from 1-benzyl - 1 - methylhydrazine.

(b) 1 - (methylphenethylamino) - 3 - phenyloxindole, M.P. 85–87° C. (2-propanol); from 1-methyl-1-phenethylhydrazine.

(c) 1 - (benzylethylamino) - 3 - phenyloxindole, M.P. 69–71° C. (2-propanol); from 1-benzyl-1-ethylhydrazine.

(d) 1 - [methyl(α-methylbenzyl)amino] - 3 - phenyloxindole, M.P. 115–121° C. (2-propanol); from 1-methyl-1-(α-methylbenzyl)hydrazine.

(e) 1 - (allylbenzylamino) - 3 - phenyloxindole, B.P. 187–188° C./0.30 mm. Hg; from 1 - allyl - 1 - benzylhydrazine.

(f) 1 - [(m - chlorobenzyl)methylamino] - 3 - phenyloxindole, M.P. 87–91° C. (ethanol); from 1-(m-chlorobenzyl)-1-methylhydrazine.

(g) 1 - [(p - chlorobenzyl)methylamino] - 3 - phenyloxindole, M.P. 121–122° C. (2-propanol-methanol); from 1-(p-chlorobenzyl)-1-methylhydrazine.

(h) 1 - [(2,4 - Dichlorobenzyl)methylamino]-3-phenyloxindole, M.P. 97–99° C. (2-propanol-methanol); from 1-(2,4-dichlorobenzyl)-1-methylhydrazine.

(i) 1 - [(o - Bromobenzyl)methylamino] - 3 - phenyloxindole, M.P. 80–82° C. (ethanol); from 1-(o-bromobenzyl)-1-methylhydrazine.

(j) 1 - [(o - Fluorobenzyl)methylamino] - 3 - phenyloxindole, M.P. 88–90° C. (ethanol); from 1-(o-fluorobenzyl)-1-methylhydrazine.

(k) 1 - [(p - Fluorobenzyl)methylamino] - 3 - phenyloxindole, M.P. 86–88° C. (ethanol); from 1-(p-fluorobenzyl)-1-methylhydrazine.

(l) 1 - [methyl(o-methylbenzyl)amino] - 3 - phenyloxindole, M.P. 78–80° C. (ethanol); from 1-methyl-1-(o-methylbenzyl)-hydrazine.

(m) 1 - {methyl[o-(trifluoromethyl)benzyl]amino}-3-phenyloxindole, M.P. 84–86° C. (ethanol); from 1-methyl-1-[o-(trifluoromethyl)benzyl]hydrazine.

(n) 1 - [(o - methoxybenzyl)methylamino] - 3 - phenyloxindole, B.P. 213–215° C./1.3 mm. Hg; from 1-(o-methoxybenzyl)-1-methylhydrazine.

(o) 1 - [(m-methoxybenzyl)methylamino] - 3 - phenyloxindole, an oil used without further purification; from 1-(m-methoxybenzyl)-1-methylhydrazine.

(p) 1 - [(p - Methoxybenzyl)methylamino] - 3 - phenyloxindole, M.P. 102–103.5° C. (ethanol); from 1-(p-methoxybenzyl)-1-methylhydrazine.

(q) 1 - [(o-ethoxybenzyl)methylamino] - 3 - phenyloxindole, B.P. 185–195° C./0.30 mm. Hg; from 1-(o-ethoxybenzyl)-1-methylhydrazine.

(r) 1 - {methyl[o - (methylthio)benzyl]amino} - 3 - phenyloxindole, M.P. 118–120° C. (ethanol); from 1-methyl-1-[o-(methylthio)benzyl]hydrazine.

(s) 1 - {methyl[p - (methylthio)benzyl]amino} - 3 - phenyloxindole, M.P. 114–115.5° C. (methanol); from 1-methyl-1-[p-(methylthio)benzyl]hydrazine.

(t) 1 - {[o - (ethylthio)benzyl]methylamino}- 3 -phenyloxindole, M.P. 105–108° C. (methanol); from 1-[o-(ethylthio)benzyl]-1-methylhydrazine.

(u) 1 - {methyl[o - (propylthio)benzyl]amino} - 3-phenyloxindole, M.P. 122–126° C. (ethanol); from 1-methyl-1-[o-(propylthio)benzyl]hydrazine.

(v) 1 - [(2 - chloro - 3 - methoxybenzyl)methylamino] 3-phenyloxindole, M.P. 112–113° C. (ethanol); from 1-(2-chloro-3-methoxybenzyl)-1-methylhydrazine.

(w) 1 - Furfurylmethylamino) - 3 - phenyloxindole, M.P. 91–93° C. ethanol); from 1-furfuryl-1-methylhydrazine.

(x) 1 - (methyl - 2 - thenylamino) - 3 - phenyloxindole, M.P. 126.5–129° C. (ethanol); from 1-methyl-1-(2-thenyl)hydrazine.

(II) Substituted hydrazines (A) 1-(o-chlorobenzyl)-1-methylhydrazine. To a stirred mixture consisting of 311 g. of N-methyl-o-chlorobenzylamine, 220 ml. of concentrated hydrochloric acid, and 1.5 liters of water, kept in a nitrogen atmosphere, is added dropwise a solution of 150 g. of sodium nitrite in 400 ml. of water. The resulting mixture is stirred at room temperature for 16 hours and extracted well with ether, and the ether extract is washed with 50% aqueous sodium hydroxide, dried and evaporated to dryness to give N-methyl-N-nitroso-o-chlorobenzylamine, which is purified by distillation; B.P. 95–97° C./0.4 mm. Hg. This intermediate compound (185 g.) is dissolved in 500 ml. of ether, and the solution is added dropwise with stirring to a suspension of 100 g. of lithium aluminum hydride in a mixture of 1.0 liter of ether and 500 ml. of tetrahydrofuran. The reaction mixture is stirred at room temperature for 16 hours and then under reflux for 20 minutes. Upon cooling, it is treated successively with 105 ml. of water, 79 ml. of 20% aqueous sodium hydroxide, and 370 ml. of water. The resulting suspension is filtered to remove insoluble solids, and the filtrate is evaporated under reduced pressure to give 1-(o-chlorobenzyl)-1-methylhydrazine; B.P. 108–110° C./3 mm. Hg.

(B) Utilizing the procedure given in II–A above, the following substituted hydrazines are obtained from the initial reaction of the amine compound designated below with sodium nitrite and hydrochloric acid, followed by reaction of the intermediate N-nitrosoamine with lithium aluminum hydride.

(a) 1-methyl-1-phenethylhydrazine, B.P. 103–105° C./3 mm. Hg; from N-methylphenethylamine.

(b) 1-benzyl-1-ethylhydrazine, B.P. 95–97° C./6 mm. Hg; from N-ethylbenzylamine.

(c) 1-methyl-1-(α-methylbenzyl)hydrazine, B.P. 89–90° C./3 mm. Hg; from N-methyl-α-methylbenzylamine.

(d) 1-allyl-1-benzylhydrazine, B.P. 49–52° C./0.15 mm. Hg; from N-allylbenzylamine.

(C) 1 - methyl-1-[p-(methylthio)benzyl]hydrazine. A mixture of 168 g. of p-(methylthio)benzoic acid and 319 g. of thionyl chloride is heated under reflux until gas evolution ceases, and it is then evaporated under reduced pressure. The residue, which is p-(methylthio)benzoyl chloride, is dissolved in 500 ml. of tetrahydrofuran, and the resulting solution is added dropwise to a stirred solution of 92 g. of methylhydrazine in 370 ml. of water at 5–10° C. The reaction mixture is stirred for 16 hours at room temperature and is then extracted with ether. The ether extract is dried and evaporated to give a residue of N-methyl-p-(methylthio)-benzoic acid hydrazide (147 g.), which is dissolved in 500 ml. of warm tetrahydrofuran, and the resulting solution is added dropwise to a suspension of 72 g. of lithium aluminum hydride in 1.5 liters of tetrahydrofuran heated under reflux. The resulting mixture is heated under reflux for 16 hours, cooled, and treated successively with 76 ml. of water, 180 ml. of 20% aqueous sodium hydroxide, and 266 ml. of water. The suspension is then filtered to remove insoluble solids, and the filtrate is evaporated under reduced pressure to give 1-methyl-1-[p-(methylthio)benzyl]hydrazine; B.P. 80–100° C./0.30 mm. Hg.

(D) Utilizing the procedure given in C above, the following substituted hydrazines are obtained from the reaction of the aryl carboxylic acid compound designated below with thionyl chloride, followed by reaction of the intermediate aryl carboxylic acid chloride with methylhydrazine, and the reaction of the intermediate aryl carboxylic acid hydrazide with lithium aluminum hydride.

(a) 1-benzyl-1-methylhydrazine, B.P. 103–105° C./15 mm. Hg; from benzoic acid.

(b) 1-(m-chlorobenzyl)-1-methylhydrazine, B.P. 115–120° C./8 mm. Hg; from m-chlorobenzoic acid.

(c) 1-(p-chlorobenzyl)-1-methylhydrazine, B.P. 110–112° C./3 mm. Hg; from p-chlorobenzoic acid.

(d) 1-(o-fluorobenzyl)-1-methylhydrazine, B.P. 102–104° C./16 mm. Hg; from o-fluorobenzoic acid.

(e) 1-(p-fluorobenzyl)-1-methylhydrazine, B.P. 95–97° C./11 mm. Hg; from p-fluorobenzoic acid.

(f) 1-methyl-1-(o-methylbenzyl)hydrazine, B.P. 99–100° C./9 mm. Hg; from o-toluic acid.

(g) 1-(o-methoxybenzyl)-1-methylhydrazine, B.P. 85–87° C./1 mm. Hg; from o-anisic acid.

(h) 1-(m-methoxybenzyl)-1-methylhydrazine, B.P. 78–98° C./0.275 mm. Hg; from m-anisic acid.

(i) 1-(p-methoxybenzyl)-1-methylhydrazine, B.P. 92–94° C./1.5 mm. Hg; from p-anisic acid.

(j) 1-furfuryl-1-methylhydrazine, B.P. 81–83° C./17 mm. Hg; from 2-furoic acid.

(k) 1-methyl-1-(2-thenyl)hydrazine, B.P. 101–107° C./12 mm. Hg; from 2-thenoic acid.

(E) 1-methyl-1-[o-(methylthio)benzyl]hydazine. A solution of 441 g. of o-(methylthio)benzoic acid and 370 g. of thionyl chloride in 500 ml. of chloroform is heated under reflux until gas evolution ceases and is then evaporated under reduced pressure. The residue, which is o-(methylthio)-benzoyl chloride, is dissolved in 1.5 liters of methanol, and the resulting solution is heated under reflux for 30 minutes and is then evaporated under reduced pressure. The residue, which is methyl o-(methylthio)-benzoate, is dissolved in 500 ml. of hot toluene, and the solution is added dropwise to a stirred suspension of 72 g. of lithium aluminum hydride in 2.0 liters of ether. The reaction mixture is heated under reflux for 3 hours, cooled, and treated successively with 106 g. of ethyl acetate and 1.4 liters of 6 N hydrochloric acid. The ethereal phase is separated, washed with dilute aqueous sodium hydroxide, dried, and evaporated to give o-(methylthio)benzyl alcohol, which is purified by distillation; B.P. 149–152° C./8 mm. Hg. This intermediate product (310 g.) is then dissolved in 1.0 liter of chloroform, to the solution is added a solution of 310 g. of thionyl chloride in 1.0 liter of chloroform, and the resulting mixture is heated under reflux until gas evolution ceases. The solution obtained is evaporated under reduced pressure, and the residue, which is o-(methylthio)benzyl chloride (417 g.), is added to a solution of 322 g. of methylhydrazine in 2.0 liters of ethanol. The resulting mixture is heated under reflux for 2 hours and evaporated under reduced pressure, and the residue is treated with excess aqueous sodium hydroxide. The basic mixture is extracted with ether, and the ether extract is washed with water, dried, and evaporated to give the desired 1-methyl-1-[o-(methylthio)benzyl]hydrazine; B.P. 101–105° C./0.60 mm. Hg.

(F) Utilizing the procedure described in E above, the following substituted hydrazines are obtained starting with the aryl carboxylic acid designated below and employing the reaction sequence of halogenation, esterification, reduction, halogenation, and reaction with methylhydrazine.

(a) 1-(2,4-dichlorobenzyl) - 1 - methylhydrazine, B.P. 89–90° C./0.20 mm. Hg; from 2,4-dichlorobenzoic acid.

(b) 1-(o-bromobenzyl)-1-methylhydrazine, B.P. 120–122° C./4 mm. Hg; from o-bromobenzoic acid.

(c) 1 - methyl-1-[o-(trifluoromethyl)benzyl]hydrazine, B.P. 98–102° C./12 mm. Hg; from α,α,α-trifluoro-o-toluic acid.

(d) 1 - (o-ethoxybenzyl)-1-methylhydrazine, B.P. 74–81° C./0.30 mm. Hg; from o-ethoxybenzoic acid.

(e) 1-[o-(ethylthio)benzyl] - 1 - methylhydrazine, B.P. 92–104° C./0.30 mm. Hg; from o-ethylthiobenzoic acid.

(f) 1-methyl-1-[o-(propylthio)benzyl]hydrazine, B.P. 112–113° C./0.50 mm. Hg; from o-propylthiobenzoic acid.

(III) 3-(2-bromoethyl)-1-[(o-chlorobenzyl)methylamino]-3-phenyloxindole

To a stirred mixture of 36 g. of 1-[(o-chlorobenzyl)-methylamino]-3-phenyloxindole, 37 g. of 1,2-dibromoethane, and 400 ml. of tetrahydrofuran in a nitrogen atmosphere is added in portions 5.0 g. of a 60% sodium hydride in mineral oil dispersion, and the reaction mixture is heated under reflux for 16 hours. Upon cooling, 300 ml. of water is added, and the aqueous mixture is extracted with ether. The ether extract is washed with water, dried, and evaporated under reduced pressure to give a solid residue of 3-(2-bromoethyl) - 1 - [(o-chlorobenzyl)methylamino]-3-phenyloxindole; M.P. 109–112° C., following crystallization from methanol.

(IV) 1-amino-3-acylaminoalkyl-3-phenyloxindoles (A) 1 - (benzylmethylamino)-3-(3-formamidopropyl)-3-phenyloxindole. A solution of 20 g. of 3-(3-aminopropyl)-1-(benzylmethylamino)-3-phenyloxindole in 50 ml. of methyl formate is heated under reflux for 48 hours and is then evaporated under reduced pressure to give the desired product; M.P. 122–124° C.

(B) 1 - (benzylmethylamino)-3-(2-formamidoethyl)-3-phenyloxindole, M.P. 133–135° C.; from the reaction of 20 g. of 3-(2 - aminoethyl) - 1 - (benzylmethylamino)-3-phenyloxindole and 50 ml. of methyl formate according to the procedure described in IV–A above.

(V) 1-amino-3-(primary amino)alkyl-3-phenyloxindoles (A) 3-(3-aminopropyl - 1 - (benzylmethylamino)-3-phenyloxindole. A mixture consisting of 135 g. of 1-(benzylmethylamino)-3-(2-cyanoethyl) - 3 - phenyloxindole, 35 ml. of triethylamine, 35 g. of Raney cobalt, and 500 ml. of toluene is shaken with hydrogen at an initial pressure of 1500 lbs./in.$^2$ at room temperature until 2 molecular equivalents of hydrogen are taken up. The catalyst is removed by filtration, and the filtrate is evaporated under reduced pressure to give 3-(3-aminopropyl)-1-(benzylmethylamino)-3-phenyloxindole, isolated as an oily liquid that is suitable for use without further purification; $n_D^{62}$ 1.5870.

(B) 3-(2-aminoethyl) - 1 - (benzylmethylamino)-3-phenyloxindole, obtained as an oil that is suitable for use without further purification; from the catalytic hydrogenation of 1-(benzylmethylamino)-3-cyanomethyl-3-phenyloxindole according to the procedure described in V–A above.

(VI) 1-amino-3-cyanoalkyl-3-phenyloxindoles (A) 1-(benzylmethylamino) - 3 - (2-cyanoethyl)-3-phenyloxindole. To a solution of 163 g. of 1-(benzylmethylamino)-3-phenyloxindole in 750 ml. of tetrahydrofuran is first added 110 g. of acrylonitrile and then 11 ml. of a 40% methanolic solution of benzyltrimethylammonium methoxide. The reaction mixture is stirred at room temperature for 1 hour, heated under reflux for 2 hours, cooled, and filtered. To the filtrate is added 1 liter of ether, and the ethereal mixture is washed with water, dried, and evaporated under reduced pressure to give 1-(benzylmethylamino)-3-(2-cyanoethyl)-3-phenyloxindole; M.P. 99–101° C., following crystallization from methanol.

(B) 1 - (benzylmethylamino) - 3 - cyanomethyl-3-phenyloxindole. To a suspension of 24 g. of a 43.5% sodium hydride in mineral oil dispersion in 500 ml. of dimethyl sulfoxide kept in a nitrogen atmosphere is added a solution of 163 g. of 1-(benzylmethylamino)-3-phenyloxindole in a mixture consisting of 250 ml. of dimethyl sulfoxide and 250 ml. of tetrahydrofuran. The solution obtained is cooled to 25° C. and stirred while a solution of 40 g. of chloroacetonitrile in 200 ml. of ether is slowly added. The resulting mixture is then stirred for an additional 30 minutes at 25° C., heated to 80–100° C. for 30 minutes, and cooled. To the cooled mixture is added 1.0 liter of ether and 500 ml. of water, and after thorough mixing, the ethereal phase is separated, dried, and evaporated under reduced pressure to give 1-(benzylmethylamino)-3-cyanomethyl - 3 - phenyloxindole; M.P. 93–95° C., following crystallization from methanol.

I claim:

1. A member of the class consisting of 1-amino-3-aminoalkyl-3-phenyloxindole compounds having in free base form the formula

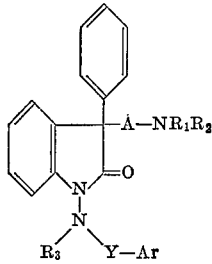

and pharmaceutically-acceptable acid-addition salts thereof; where $R_1$ and $R_2$ are members of the class consisting of alkyl radicals having not more than 3 carbon atoms and further members wherein $R_1$ and $R_2$ are combined and together with the nitrogen atom to which they are attached represent a member of the class consisting of 1-pyrrolidinyl, piperidino, hexahydro-1H-azepin-1-yl, 3-methylpiperidino, and 2,6-dimethylpiperidino; $R_3$ is a member of the class consisting of methyl, ethyl, and allyl; A represents a member of the class consisting of ethylene, propylene, and trimethylene; Y represents a member of the class consisting of methylene, ethylene, and ethylidene; and Ar represents a member of the class consisting of phenyl, monosubstituted phenyl, in which the substituent is selected from the class consisting of fluorine, chlorine, bromine, trifluoromethyl, methyl, methoxy, ethoxy, methylthio, ethylthio, and n-propylthio, dichlorophenyl, 2-chloro-3-methoxyphenyl, 2-furyl, and 2-thienyl.

2. A compound according to claim 1 which is 1-(benzylmethylamino)-3-phenyl - 3 - [2-(1-pyrrolidinyl)ethyl]oxindole, monohydrochloride.

3. A compound according to claim 1 which is 3-[3-(dimethylamino)propyl] - 1 - {methyl[o - (methylthio)benzyl]amino}-3-phenyloxindole.

4. A compound according to claim 1 which is 3-[2-(diethylamino)ethyl] - 1 - {methyl[o - (methylthio)benzyl]amino}-3-phenyloxindole.

5. A compound according to claim 1 which is 1-{methyl-[o-(methylthio)benzyl]amino} - 3 - phenyl-3-(2-piperidinoethyl)-oxindole.

6. A compound according to claim 1 which is 1-[(2-chloro 3 - methoxybenzyl)methylamino]-3-[2-(diethylamino)-ethyl]-3-phenyloxindole.

References Cited
UNITED STATES PATENTS 3,314,954   4/1967   Meyer _____ 260—294c HENRY R. JILES, Primary Examiner
S. D. WINTERS, Assistant Examiner U.S. Cl. X.R.

260—325, 294, 240; 424—267, 274